(12) United States Patent
Levenduski et al.

(10) Patent No.: US 6,668,567 B2
(45) Date of Patent: Dec. 30, 2003

(54) THERMAL STORAGE APPARATUS AND METHOD FOR AIR CONDITIONING SYSTEM

(76) Inventors: Robert Levenduski, 6774 Snead Ct., Niwot, CO (US) 80503; James Marsh Lester, 0123 Elk Mountain Dr., Redstone, CO (US) 81623

(*) Notice: Subject to any disclaimer, the term of this patent is extended or adjusted under 35 U.S.C. 154(b) by 0 days.

(21) Appl. No.: 10/155,817

(22) Filed: May 23, 2002

(65) Prior Publication Data

US 2003/0014987 A1 Jan. 23, 2003

Related U.S. Application Data

(63) Continuation-in-part of application No. 09/661,984, filed on Sep. 14, 2000, now Pat. No. 6,393,861.
(60) Provisional application No. 60/154,643, filed on Sep. 17, 1999.

(51) Int. Cl.[7] ............................. F25D 17/02; F25D 11/00
(52) U.S. Cl. ............................................. 62/185; 62/435
(58) Field of Search ........................ 62/430, 434, 435, 62/439, 129, 59, 181; 165/10

(56) References Cited

U.S. PATENT DOCUMENTS

| | | | |
|---|---|---|---|
| 1,496,676 A | 6/1924 | Jauvert | |
| 2,996,894 A | 8/1961 | Shade | 62/59 |
| 3,938,352 A | 2/1976 | Schmidt | 62/279 |
| 3,976,123 A | 8/1976 | Davies | 165/29 |
| 4,123,914 A | 11/1978 | Perez et al. | 62/196 |
| 4,609,036 A | 9/1986 | Schrader | 165/10 |
| 4,637,219 A | 1/1987 | Grose | 62/199 |
| 4,720,984 A | 1/1988 | Ames | 62/434 |
| 4,964,279 A | 10/1990 | Osborne | 62/59 |
| 5,036,904 A | 8/1991 | Kanda et al. | 165/10 |
| 5,239,839 A | 8/1993 | James | 62/434 |
| 5,277,038 A | 1/1994 | Carr | 62/434 |
| 5,297,397 A | 3/1994 | Pointer | 62/238.6 |
| 5,386,709 A * | 2/1995 | Aaron | 62/199 |
| 5,553,463 A | 9/1996 | Pointer | 62/238.6 |
| 5,680,898 A | 10/1997 | Rafalovich et al. | 165/236 |
| 6,393,861 B1 | 5/2002 | Levenduski et al. | 62/434 |

FOREIGN PATENT DOCUMENTS

| | | | | |
|---|---|---|---|---|
| JP | 4-327790 | 11/1992 | | 62/430 |
| JP | 5-45008 | 2/1993 | | 62/430 |
| JP | 5-71808 | 3/1993 | | 62/430 |
| JP | 5-264078 | 10/1993 | | 62/430 |

* cited by examiner

Primary Examiner—Melvin Jones
(74) Attorney, Agent, or Firm—Sheridan Ross P.C.

(57) ABSTRACT

A thermal energy storage unit is provided in connection with an air conditioning or refrigeration condenser. Working fluid waste heat is stored in the thermal energy storage unit during at least a relatively hot part of the day. Heat stored in the thermal energy storage unit is then rejected to the air during a cooler period, such as night. By rejecting the stored heat directly to the atmosphere, there is no need to provide an energy-consumptive refrigeration cycle for cooling the thermal storage medium material. In this way, a refrigeration system compressor has a reduced load and/or reduced duty cycle during hot parts of the day and relatively less energy can be used during high-demand times when energy may be more expensive.

16 Claims, 10 Drawing Sheets

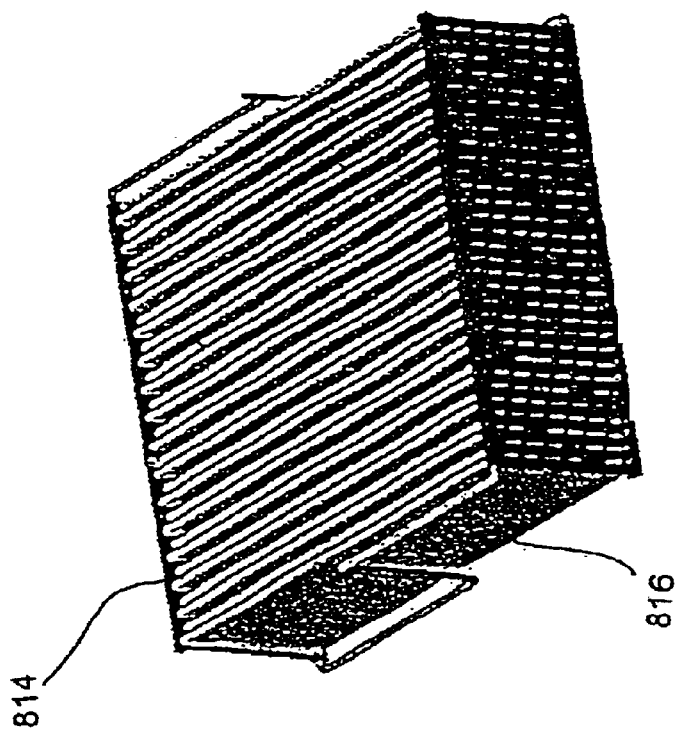
FIG.10
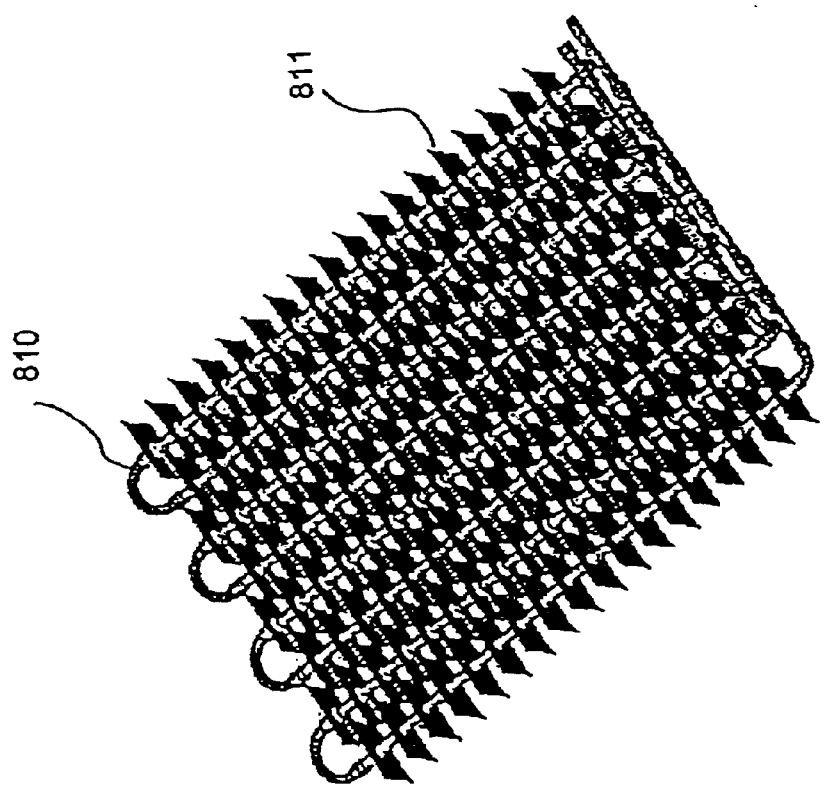

THERMAL STORAGE APPARATUS AND METHOD FOR AIR CONDITIONING SYSTEM

This is a continuation-in-part patent application which claims priority from pending U.S. patent application Ser. No. 09/661,984, filed Sep. 14, 2000, which claims priority from U.S. Provisional Patent Application No. 60/154,643, filed on Sep. 17, 1999. Both applications are considered to be part of the disclosure of the accompanying application, and are herein incorporated by reference.

Cross reference is made to Disclosure Document No. 431,861, titled "Energy Saving Air Conditioning or Refrigeration System" of Robert Levenduski and James Marsh Lester, dated Feb. 16, 1998 and received in the U.S. Patent and Trademark Office on Feb. 26, 1998.

FIELD OF THE INVENTION

The present invention relates to a method and apparatus for air conditioning systems which involves a thermal storage unit and in particular to a unit which can store heat when ambient air temperature is high and release stored heat directly to ambient air when the ambient air temperature is lower.

BACKGROUND OF THE INVENTION

A typical refrigeration circuit such as the type used for air conditioning, refrigeration and the like, includes, among other components, a condenser unit for removing heat from the working fluid, such as Freon. In a typical house or building air conditioning system, the condenser is placed outdoors and includes an arrangement of tubing, often coupled to fins, or other heat dispersing units, and often provided with a fan or similar device for providing air flow over the coils and fins. In this way, heat may be transferred from the working fluid substantially directly (i.e., by heat traveling only through the walls or surfaces of the coils or fins) to the ambient air. Because heat flows only from warmer to cooler bodies, the working fluid can be cooled, in such condenser, only if the temperature of the working fluid is higher than the temperature of the ambient air. When the ambient air temperature is relatively high, such as on summer afternoons when air conditioning is likely to be used, it may be necessary to provide relatively high compression of the working fluid in order to achieve a working fluid temperature which exceeds ambient air temperature. Such high compression can be relatively energy consumptive creating high demand for electrical energy. In many situations, energy is priced such that its cost is higher during high demand times and accordingly traditional air conditioning systems can be relatively expensive to operate.

One approach to this situation has been to provide a system in which working fluid heat is stored in a thermal storage medium such that the storage medium can be cooled, using a refrigeration process, at a later time. Although this approach may provide certain benefits, it requires the use of a refrigeration unit, and thus the consumption of electrical power, for cooling the heat storage medium, albeit, possibly at a time of lower ambient air temperature. The consumption of electricity for a refrigeration process (e.g. to run a compressor) can be undesirably costly. Accordingly, it would be useful to provide a system which can store some or all condenser heat, e.g., during high ambient air temperature periods, without the need for using a refrigeration unit for cooling the heat storage medium. It would further be advantageous to provide a system which provides an efficient heat transfer system with radiant fins and other heat exchanging means to cool the storage medium during non-peak operating hours, i.e. at nighttime.

SUMMARY OF THE INVENTION

The present invention includes a recognition of certain problems in previous approaches including as described herein. According to one aspect of the invention, heat from the condenser coils of an air conditioning unit can be stored in a heat storage medium, preferably by melting or otherwise changing phase of some or all of the medium. Preferably, such heat storage occurs when ambient air temperature is relatively high, such as exceeding a first threshold temperature. At a later time, such as when ambient air temperature is below a second threshold temperature, the heat storage medium is cooled, not by a refrigeration cycle, but by transferring heat directly to the ambient air, e.g., blowing ambient air around containers of the heat storage medium. In this way, the heat storage medium can be cooled, for reuse in the next high-air-temperature cycle, but without the need for using refrigeration for cooling the working fluid.

Although the present invention can be implemented with a variety of heat storage materials, it is preferred to use a material which can take advantage of latent heats of phase change such as latent heats of melting and freezing. In one embodiment, a material is provided which is relatively inexpensive, has a melting/freezing point occurring at temperatures similar to temperatures found during night time ambient air temperatures and which also has a relatively high latent heat of melting/freezing. In one embodiment, the heat transfer material is a calcium chloride hydrate.

Preferably the system is configured so that it is relatively inexpensive to design, fabricate, operate, maintain or repair. In one embodiment, the heat storage material is encapsulated in containers which are sized shaped and positioned, relative to other components, to achieve both the melting and the freezing of the heat storage material in-place (i.e., without the need to pump or transfer heat storage material from a melting location to a freezing location) and preferably such that the system can be relatively easily, and preferably automatically, changed from the melting configuration to the freezing configuration. In one embodiment, a valve or switch responds to temperatures in excess of a first ambient air threshold temperature to shunt working fluid from an ordinary air-cooled condenser coil to a coil in contact with the heat storage medium. In one embodiment, the system responds to a temperature which is below a second threshold temperature, by using a simple switch or valve to provide desired air flow for cooling the heat storage medium such as by activating a fan or blower.

In this way, a system according to the present invention can not only relieve some or all of the compressor burden normally imposed by high ambient air temperatures (thus reducing operating energy consumption and, possibly reducing wear on compressor components) but also reduce energy costs by reducing the amount of energy which is consumed during relatively high-energy-cost periods.

In one aspect of the present invention, a thermal energy storage unit is provided in connection with an air conditioning or refrigeration condenser. Working fluid waste heat is stored in the thermal energy storage unit during at least a relatively hot part of the day. Heat stored in the thermal energy storage unit is then rejected to the air during a cooler period, such as night. By rejecting the stored heat directly to the atmosphere, there is no need to provide an energy-consumptive refrigeration cycle for cooling the thermal storage medium material. In this way, a refrigeration system compressor has a reduced load and/or reduced duty cycle during hot parts of the day and relatively less energy can be used during high-demand times when energy may be more expensive.

In another aspect of the present invention, a self-contained heat storage and heat exchanger system is provided which is placed adjacent to or stacked below or above an existing air conditioning unit. In this embodiment, the desired heat transfer from the hot working fluid in the air conditioning system would be attained through another heat transfer step between the working fluid and a separate coolant loop in the self-contained system. The use of a self-contained system would require fewer modifications to an existing air conditioning system and would further facilitate retrofitting previously installed air conditioning systems. Alternatively, new installations would be installed incorporating both the typical air conditioning unit and the self contained thermal storage unit in one packaged system ready for installation.

In one embodiment of the present invention, the hot working fluid is placed in thermal communication with the coolant of the self-contained unit, and the heat from the working fluid is then transferred to the thermal storage medium. During off-peak nighttime hours, when ambient air temperature is cooler, the heat energy stored in the thermal storage medium is transferred to the cooler ambient air. As a result of the cooler working fluid in the air conditioning unit, higher efficiencies are obtained.

It is yet another aspect of the present invention to improve the transfer of heat between the fluid in the thermal storage unit and the thermal storage medium. By employing a plurality of tubes and fins or parallel heat exchanging plates immersed in the thermal storage medium, more of the thermal storage medium's surface area will be exposed to the hot liquid in the coolant loop.

Thus in one aspect of the present invention a method for providing reduced energy consumption of a cooling unit for cooling at least a first space, the cooling unit having at least a compressor, for compressing a working fluid, a condenser and an evaporator, the method comprising:

transferring at least first heat from said working fluid to a second fluid;

placing said second fluid in thermal communication with a first change-of-phase heat storage material having a first temperature whereby at least some of said first change-of-phase material changes from a first phase to a second phase and absorbs latent heat, and wherein said first phase is substantially solid and said second phase is substantially liquid;

transferring heat from said change-of-phase material to the ambient air whereby at least some of said change-of-phase material changes phase from said second phase to said first phase and releases latent heat.

BRIEF DESCRIPTION OF THE DRAWINGS

FIG. 10 depicts a finned-tube and parallel plate heat exchangers which may be positioned in the heat storage medium in one embodiment of the present invention.

DETAILED DESCRIPTION OF THE PREFERRED EMBODIMENT

Figure 1A:
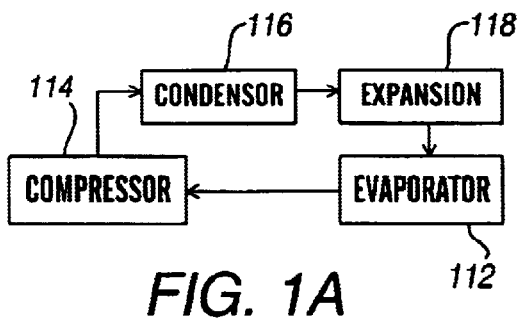
FIG. 1A is a block diagram of a conventional refrigeration system.

Depicted in FIG. 1A, in a conventional system, working fluid, returning from an evaporator 112 is compressed, to a relatively high pressure, by a compressor 114. The relatively high pressure and high temperature working fluid is cooled in the condenser 116 typically by transferring working fluid heat to the ambient air, and typically converting the working fluid from a vaporous state to a liquid state. The condensed working fluid is expanded to a lower pressure and temperature through an expansion valve or capillary 118 and provided to the evaporator 112 where heat is absorbed, e.g., ultimately from a room or building being air conditioned, boiling the working fluid and changing it to a vaporous state.

Figure 2:
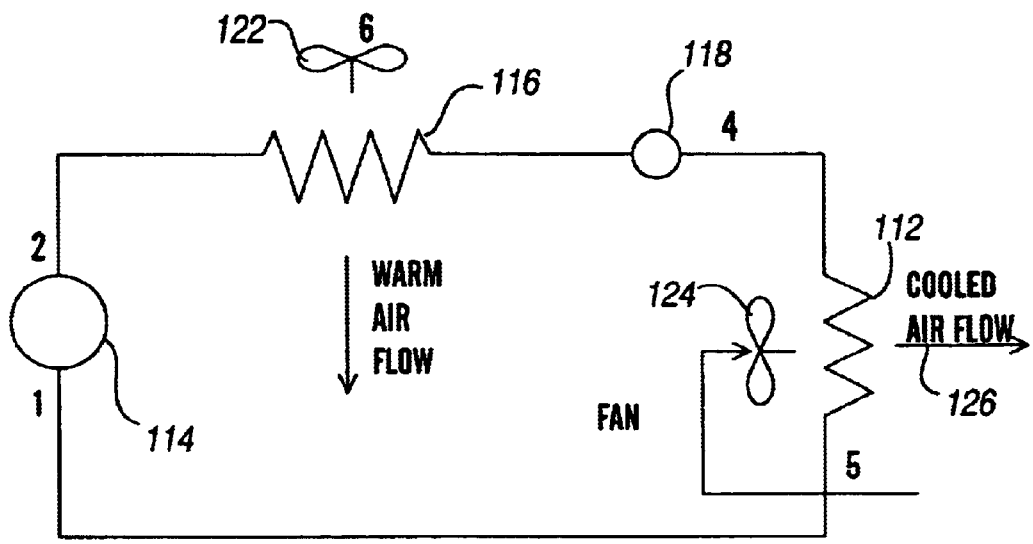
FIG. 2 is a block diagram of a refrigeration system according to previous approaches.

Referring to FIG. 2, the working fluid temperature, at the point it enters the compressor 114, is typically warmer than the refrigerant boiling point such that the working fluid is in a vaporous state, but it is typically lower than ambient air temperature. The compressor 114 raises the pressure of the fluid and accordingly raises its temperature. Typically, the temperature of the working fluid as it exits the compressor 114 must be higher than the ambient air temperature if, as is typical in prior devices, the working fluid is to be air-cooled. Thus, when ambient air temperatures are relatively high, such as 100° F. or more, compressor 114 must provide sufficient compression to raise the temperature above the ambient air temperature creating a relatively heavy load on the compressor and relatively high energy consumption. For example, if the ambient air temperature is 100°, the compressor 114 may, for example, provide sufficient compression to raise the temperature of the working fluid, as it exits the compressor 114 to, e.g., about 105° F. Air flow over the condenser coils 116, e.g., provided by a fan 122 cools the working fluid to approximately the ambient air temperature. The expansion valve 118 further cools the working fluid before it is provided to the evaporator 112 where working fluid is boiled, e.g., by blowing building or room air over the evaporator coils 112, e.g., using the fan 124, providing a cooled air flow 126 for use in the building or room.

Figure 3:
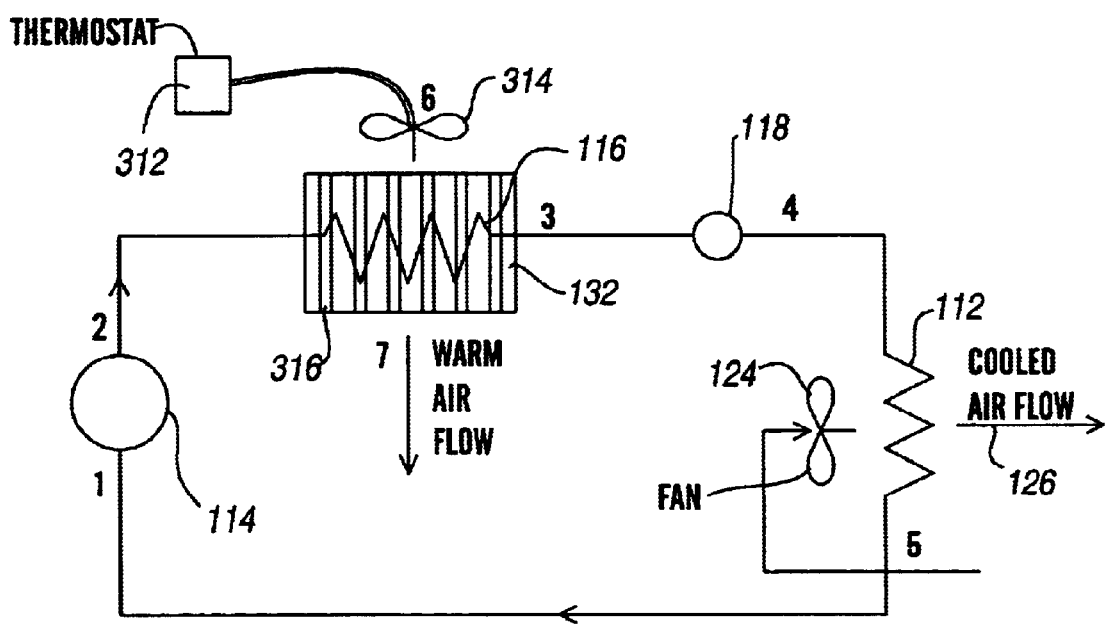
FIG. 3 is a block diagram of a refrigeration system according to an embodiment of the present invention.

In the embodiment depicted in FIG. 3, some or all of the coils of the condenser 116 are in thermal communication with a fluid storage medium of a thermal storage unit 132. Preferably, the fluid storage medium has a melting point substantially lower than expected maximum ambient air temperatures. This way, heat can be transferred from the working fluid to the thermal storage medium while the working fluid has a temperature which is greater than the melting point of the thermal storage medium, but may be less than the ambient air temperature. For example, if thermal storage medium has a melting point of about 100° F., and the ambient air temperature is about 110° F., the system depicted in FIG. 3 will provide the desired transfer of heat from the working fluid to the thermal storage medium when the working fluid is only slightly above 100° (such as about 102°) but is substantially less than the ambient air temperature. In this embodiment, because the compressor 114 is used to raise the working fluid only to about 102° (rather than a temperature greater than 110°) the load on the compressor, and the energy consumption of the compressor, during high ambient air temperature periods is reduced.

Preferably, the system is configured such that when ambient air temperatures are relatively low, such as below a first threshold temperature (which may, if desired, be set approximately equal to the melting point of the thermal storage medium) working fluid is provided to condenser coils which are air-cooled. Preferably, the ambient air temperature is sensed and, if ambient air temperature exceeds the first threshold temperature, working fluid is provided to condenser coils which are in thermal communication with the thermal storage medium and, preferably, the (relatively high temperature) ambient air will not be in substantial thermal communication with the thermal storage medium. This configuration will persist as long as the ambient air temperature is greater than the first threshold temperature. Accordingly, heat from the working fluid will continue to be transferred to the thermal storage medium, melting some or all of the thermal storage medium and, in some cases, eventually raising the temperature of the thermal storage medium.

In addition to the thermal storage unit 132, it may be desired to add a refrigerant liquid reservoir, e.g., with controls in vicinity of a thermal storage unit, to provide refrigerant pressure control over the entire range of operating conditions, so as to facilitate additional energy savings.

When the ambient air temperature is sufficiently low (typically at night) ambient air can be used to cool the thermal storage medium, thus transferring the heat which was stored in the thermal storage medium to the atmosphere. Accordingly, in one embodiment, when the ambient air temperature falls below a second threshold temperature, which may be, e.g., equal to the freezing point, or somewhat below the freezing point, of the energy storage medium, a thermostat 312 will sense this temperature and activate a fan 314 causing air flow through air flow passages 316 positioned to provide substantial thermal communication between the flowing air and the thermal storage medium, thus moving heat from the thermal storage medium, preferably lowering the temperature of, and/or refreezing, the thermal storage medium. Such lowering of the temperature and/or refreezing of a thermal storage medium during low temperature conditions prepares the system for another cycle of high ambient air temperature operation, as described above.

Figure 1B:
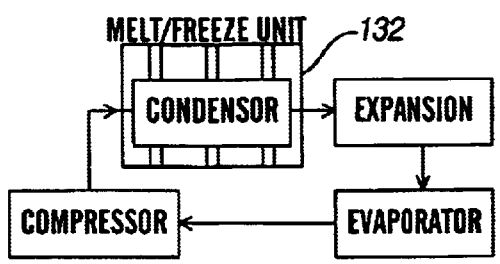
FIGS. 1B, 1C, 1D and 1E are block diagrams of systems according to embodiments of the present invention.

The thermal storage or melt-freeze unit 132 can be positioned or configured in a number of fashions. In the embodiment of FIG. 1B, the thermal storage medium of the thermal storage unit 132 is in substantially direct thermal communication with the condenser coils so that whenever the working fluid, in the condenser, exceeds the melting point of the thermal storage medium, heat will be transferred to the thermal storage medium.

Figure 1C:
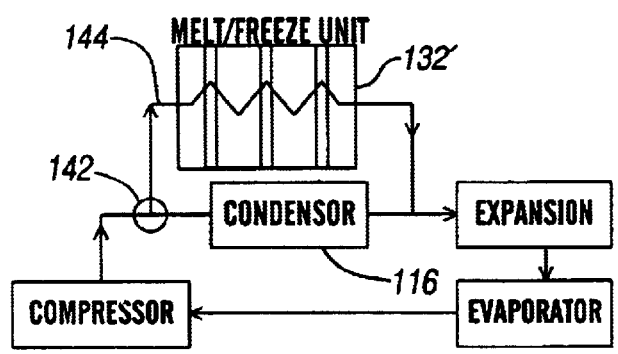

In the embodiment of FIG. 1C, a thermal storage medium 132' is provided separate from the condenser 116. In the embodiment of FIG. 1C, as long as the ambient air temperature is below the first threshold temperature, working fluid flows directly to the condenser 116 which is air cooled, e.g., using a fan, thus operating in a manner similar to the conventional configuration depicted in FIG. 1A. When ambient air temperature exceeds a threshold temperature, this condition is sensed, e.g., by a thermostat, and a switch 142 or valve is activated causing the working fluid to flow 144 into the thermal storage unit 132' which has its own set of coils, for transferring heat from the working fluid to the thermal storage medium.

Figure 1D:
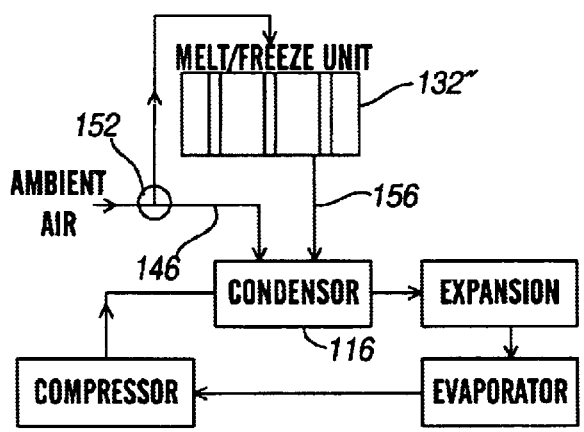

In yet another embodiment depicted in FIG. 1D, as long as ambient air temperature is below a threshold temperature, ambient air is caused to flow over the condenser 146 for operation in the conventional fashion. However, in the embodiment of FIG. 1D, if ambient temperature exceeds the first threshold temperature, a switch or valve 152 causes ambient air to first flow through the heat storage unit 132" where heat is extracted from ambient air resulting in a flow of cooled air 156 which is then flowed over the condenser 116. In this way, the condenser 116 can be provided with working fluid which has a temperature below the ambient air temperature but greater than the temperature of the cooled air flow 156.

Figure 1E:
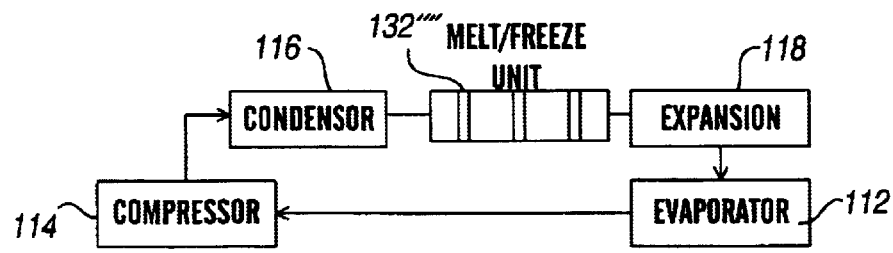

In the embodiment depicted in FIG. 1E, the thermal storage unit 132"" cools the working fluid after it has been initially cooled in the condenser 116. Preferably, the working fluid, whenever it is being output from the condenser, is placed in thermal communication with the change-of-phase material to provide substantially continuous transfer of heat to the change-of-phase material (i.e. not necessarily restricted to high ambient temperature times or particular times of day). In this situation, the heat storage unit operates as a sub-cooler for the previously condensed working fluid, generally cooling the working fluid to a temperature which is below its condensation temperature and also below the ambient temperature. At least some energy savings can be realized from the fact that sub-cooled working fluid can provide more efficient cooling than the (possibly only barely) condensed but relatively warm (i.e. no cooler than ambient air temperature) working fluid that exits the condenser in high ambient-temperature conditions. Although it is anticipated the embodiment of FIG. 1E may provide a lower magnitude of energy savings than at least some other embodiments, the embodiment of FIG. 1E may nevertheless present an attractive cost/benefit ratio, at least because the heat storage unit 132"" can more readily be provided in smaller, simpler and less expensive form. Furthermore the embodiment of FIG. 1E can readily be used to retrofit existing air conditioning units since (from the point of view of working fluid flow) it can be spliced-in downstream of the condenser, and there is little or no need to modify the condenser or other components of the system.

Figure 4:
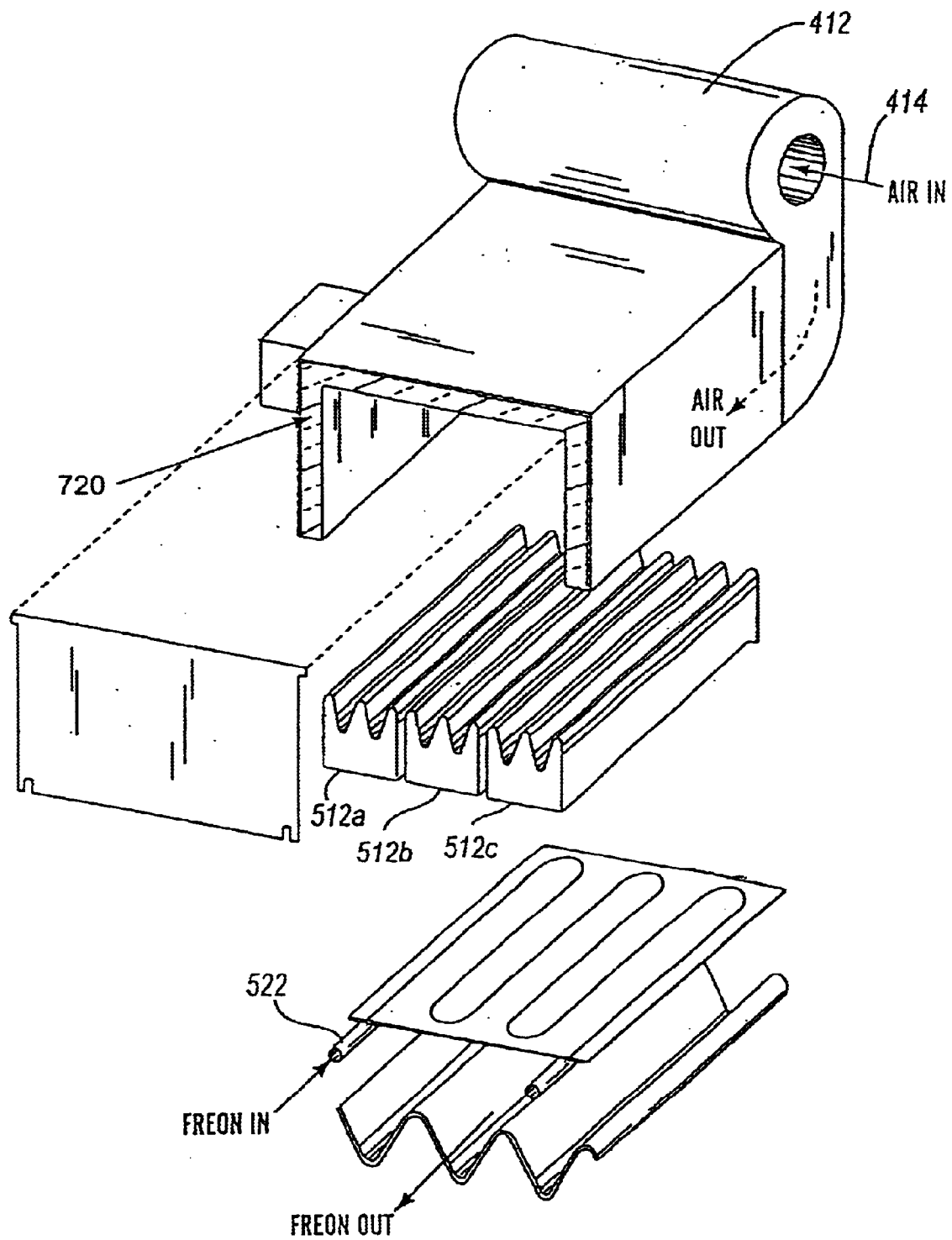
FIG. 4 is an exploded perspective view of a heat storage unit according to an embodiment of the present invention.
Figure 5:
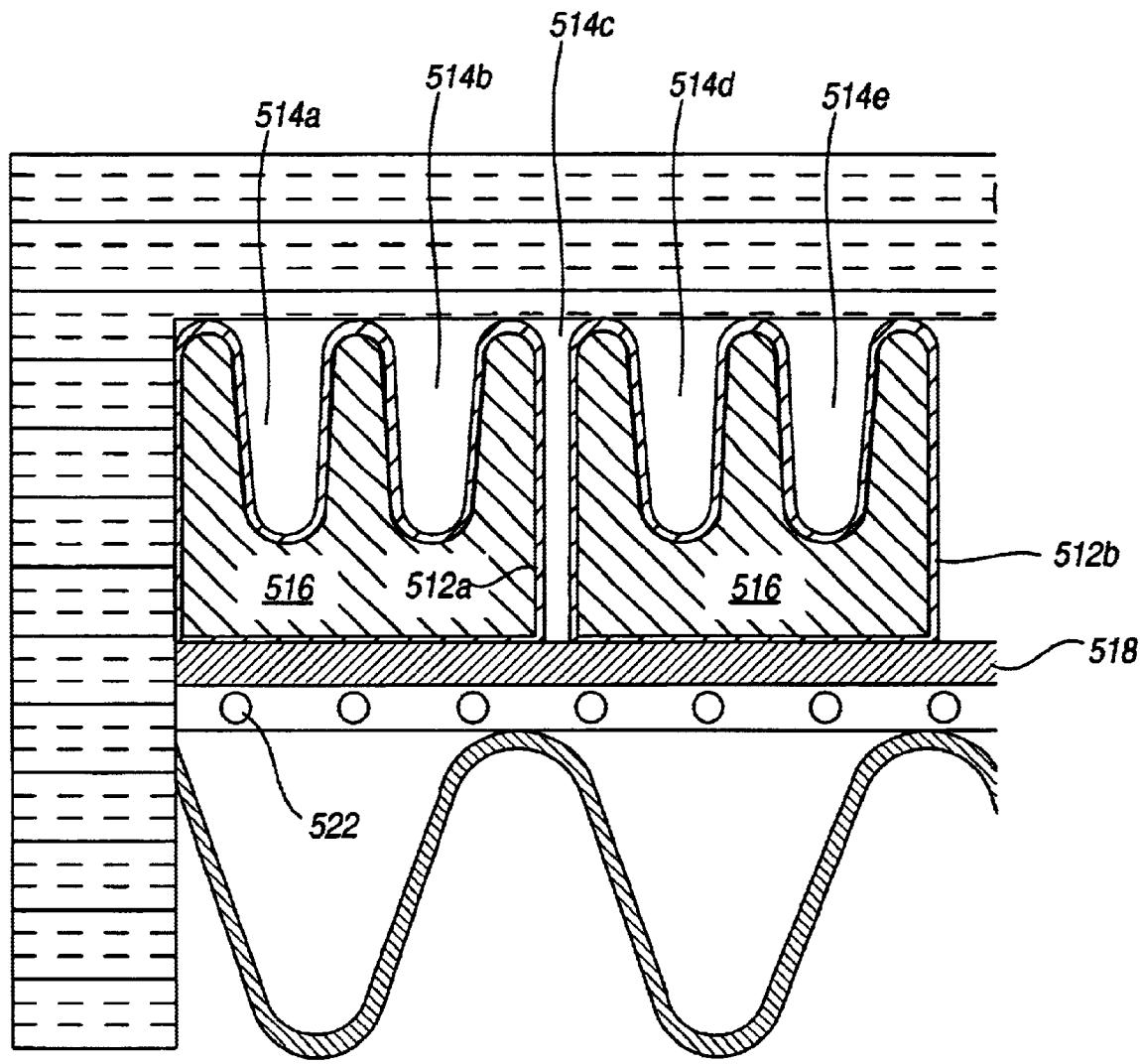
FIG. 5 is a partial cross-sectional view of a heat storage unit according to an embodiment of the present invention.

As depicted in FIGS. 4 and 5, in one embodiment, the thermal storage unit provides a plurality of capsules 512a, 512b, 512c preferably configured to define a plurality of channels 514a–e. The capsules 512a,b, and c contain a thermal storage medium 516. A number of materials can be used as the thermal storage medium. Preferably, the thermal storage medium has a relatively low cost, a relatively high latent heat of melting/freezing and a melting/freezing point lower than the highest anticipated ambient air temperature. In one embodiment, the transfer medium is a calcium chlorate hydrate. Other possible media is useable in connection with the present invention include other salt hydrates such as hydrates of sodium sulfate or disodium phosphate, waxes or other organics such as paraffin or artificial spermacetti. Other suitable materials will be apparent to those of skill in the art after understanding the present disclosure.

In the preferred embodiments, the frozen heat storage medium has a density greater than liquid heat storage medium. Accordingly, the capsules 512 are contacted on their lower surfaces with the heat transfer plate 518 which is in contact with the coils of a working fluid conduit 522. Preferably, the coils 522, plates 518 and capsule 512 are formed of a substantially thermally conductive material, and one which is preferably relatively low cost, such as steel, copper or other metals or metal alloys. During a melting phase of operation, working fluid circulating through the coils 522 provides heat which transferred through the plate 518 and capsule 512 to the thermal storage material 516 which begins to melt. Preferably, the storage material 516 selected, and the capsule 512 is configured and selected, such that the melting heat storage material easily releases from the walls of the capsule 512. Thus, less-dense, liquid heat storage medium rises to the top of the capsules 512 and the still-solid medium migrates downward to remain substantially near, or in contact with, the plate 512 to provide efficient melting and/or heating of the thermal storage medium. During the freezing phase of operation, a fan or blower 412 draws ambient air in 414 causing it to go through the channels 514a–e providing relatively efficient heat transfer for cooling and/or freezing the thermal storage medium 516.

Figure 6:
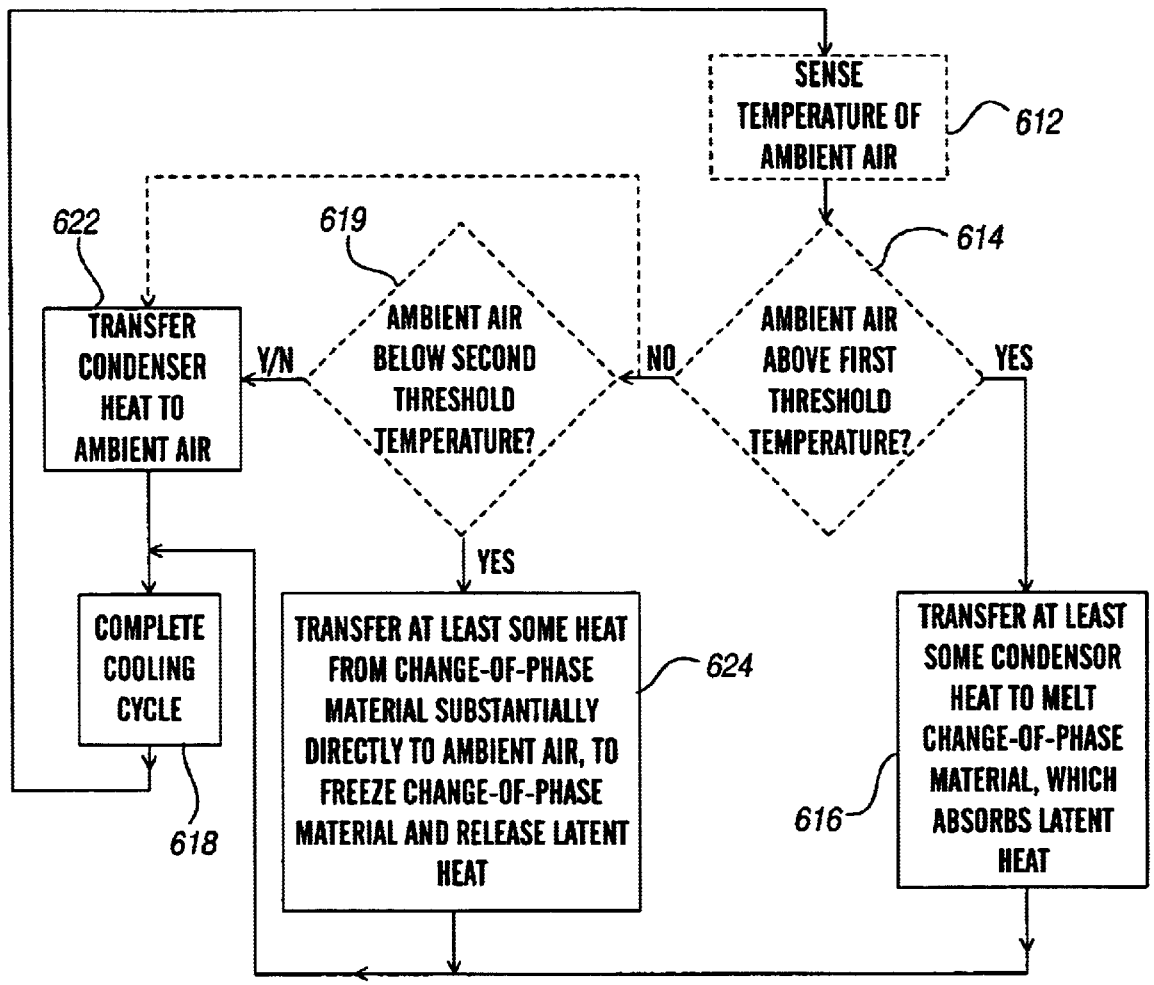
FIG. 6 is a flow chart of a process according to an embodiment of the present invention.

In operation, as depicted in FIG. 6, when the sensing of ambient air temperature 612 indicates that ambient air temperature is above a first threshold temperature, such as the melting point of the storage material, 614, at least some of the working fluid heat in the condenser is transferred to the storage material which is preferably a change-of-phase material, which, in melting, absorbs latent heat form the working fluid 616. The thus-cooled working fluid is eventually provided to the expansion valve 118 and evaporator 112 to complete the cooling cycle 618. If the sensed temperature of the ambient air is not above the first threshold temperature, the working fluid heat in the condenser can be transferred directly to the ambient air, if desired 622, and the cooling cycle completed 618. If the ambient air is also below a second threshold temperature 618 (which may be less than or equal to the first threshold temperature) heat from the change of phase material (i.e., the thermal storage medium) is transferred substantially directly to ambient air, e.g., by blowing ambient air through passages which are in thermal communication with the change of phase material, to lower the temperature and/or freeze the change of phase material thus releasing latent heat to the ambient air 624.

In light of the above description, a number of advantages of the present invention can be seen. The present invention makes it practical to provide a refrigeration cycle when the working fluid temperature is not substantially above the ambient air temperature, while avoiding the need for using an energy consumptive refrigeration cycle (i.e., other than energy consumption for, e.g., a fan) to cool the thermal storage medium. The present invention can provide for reduced consumption of energy by a compressor under high ambient air temperature conditions, potentially also reducing wear or strain on condenser or condenser components. The present invention can reduce air conditioning costs by lowering the energy consumption during those periods when energy demand is likely to be high and energy costs may be higher than other periods. The present invention can provide an improved air conditioning system which is fundamentally more efficient. Without wishing to be bound by any theory, it is believed at least some increase in efficiency during high ambient air temperature periods arises from the ability to reject heat to a temperature which is lower than ambient (i.e., considering the Carnot principle).

A number of variations of modifications of the present invention can be used. It is possible to use some features of the invention without using others. For example, it is possible to use a mode of transferring working fluid into a thermal storage medium without sensing ambient air temperature as a basis for using such a mode. Although some embodiments provide for storing heat in the phase change material only when temperatures of ambient air exceeds a threshold, it is also possible to provide systems in which heat is stored in the change of phase material at certain times of day or substantially continuously during any refrigeration cycle. Although in some embodiments, the heat storage medium is cooled by ambient air at times when ambient air temperatures are below a predetermined threshold temperature, it is also possible to perform air-cooling of the heat storage medium at certain times of day and/or to provide ambient air flow over melted medium substantially continuously during certain periods of time. Although embodiments of the present invention provide for cooling the working fluid without the need for using a refrigeration unit for this purpose, it is also possible to provide configurations in which air-cooling of the heat storage medium as supplemented by other cooling procedures. Although embodiments have been described in which direct heat transfer is used for both heating the storage medium (e.g., direct transfer from the refrigeration working fluid to the heat storage medium) and cooling the heat storage medium (e.g., direct contact of air flow, during low temperature periods, with containers of the heat storage medium). It is also possible to use a secondary heat transfer material or system for either or both of these heat transfer steps.

Figure 7:
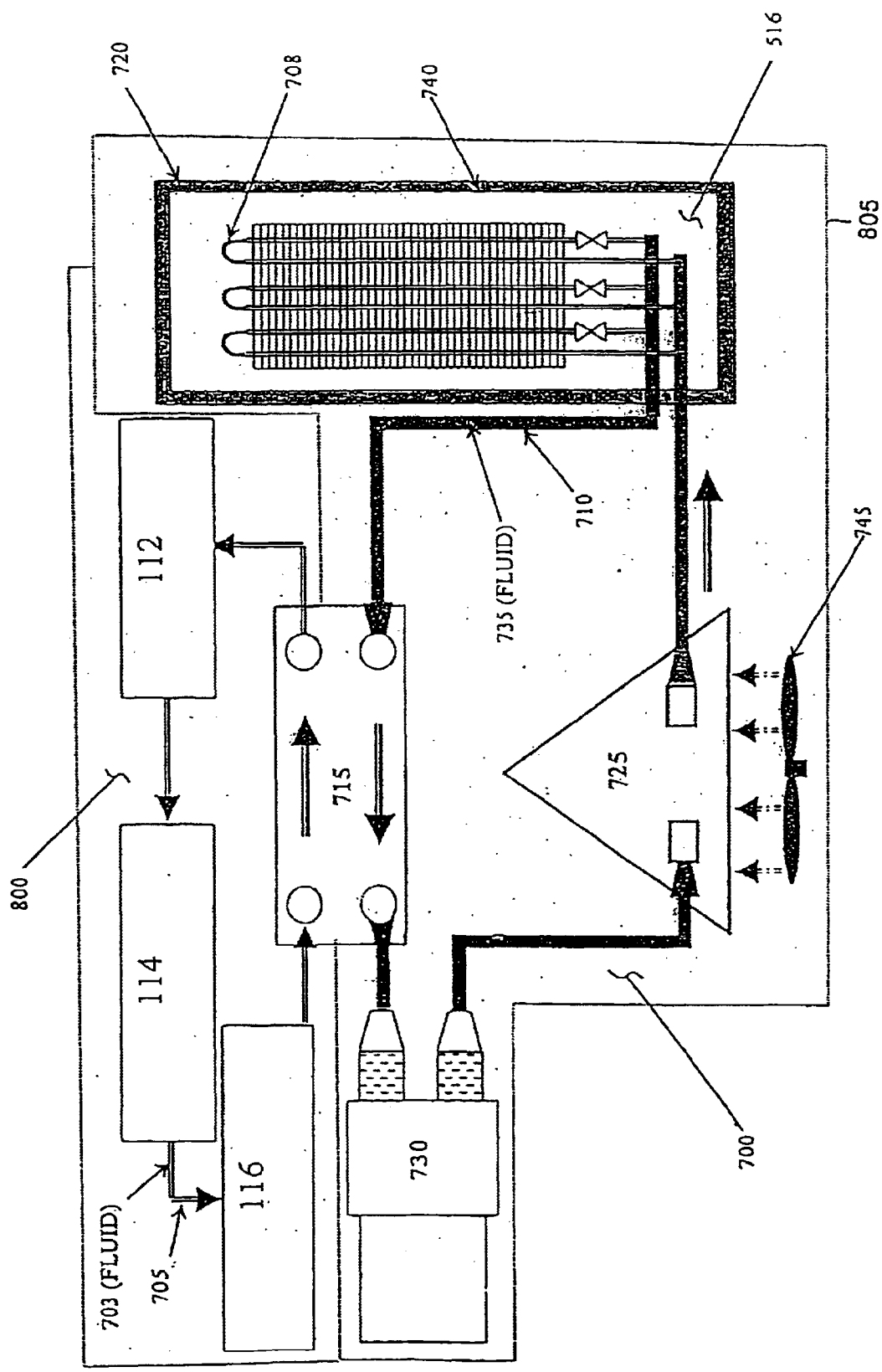
FIG. 7 is a detailed flow according to one embodiment of the present invention, and identifying the various components associated therewith.

Referring now to the embodiment depicted in FIG. 7, a thermal energy storage unit 700 is shown with the various components associated thereto, and more specifically a heat exchanger 715 coupled to a conventional air conditioner 800. In the heat exchanger 715, the working fluid loop 705 of the air conditioner 800 comes in thermal communication with a cooling circulation loop 710 that is in thermal communication with the thermal storage medium 516. The working fluid 703 used in association with the air conditioning unit 800 is not in direct thermal communication with the thermal storage medium 516.

The thermal energy storage unit 700 is designed to absorb and store heat from the working fluid 703 during the day, and release the stored heat to the cool night air thus reducing the temperature of the thermal storage medium prior to operation during the peak daylight hours. The thermal energy storage unit 700 comprises in one embodiment, among other things, the thermal storage medium 516, a thermal storage medium container 740, a thermal medium heat exchanger 708, insulation 720, a circulation loop 710, a liquid-air heat exchanger 725, a pump 730, a heat exchange fluid 735 (fluid is in loop 710, but not specifically shown), and an enclosure 805.

The cooling fluid 735, conditioned by the thermal storage unit, will be heated by the transfer of thermal energy from the air conditioner's working fluid 705 in the heat exchanger 715. This heated fluid 710 will be pumped through a liquid-air heat exchanger 725, which is analogous to the condenser in a conventional air conditioner. A fan 745 may also be used to facilitate the liquid cooling by drawing cool air across the heat exchanger 725 fins or similar apparatus.

The fan function may also be provided by the existing air conditioning unit, and thus lowering expenses. The cooler liquid is then passed through a heat exchanger 708 which is embedded within the thermal storage medium 516. Preferably, the thermal storage medium and the heat exchanger are enclosed 740 and insulated 720 to prevent leakage and improve efficiency of the unit. The cooler fluid 735 is then put into thermal communication with the working fluid 703 to further cool the working fluid 703 in the air conditioning unit heat exchanger 715 after it has been condensed and prior to it's expansion and evaporation. The cycle is then repeated. The heat exchanger 708 may also be placed in thermal communication with the storage medium as shown in FIGS. 4 and 5 with a varying degree of efficiency. Alternatively, and as appreciated by those skilled in the art, different types of heat exchanging mechanisms maybe employed to efficiently transfer thermal energy from the circulatory cooling fluid 735 and the thermal storage medium 516.

Several different types of materials can be used for the thermal storage medium 516. The important properties of the medium are high latent heat and the phase change temperature. Preferably, the fluid storage medium 516 has a melting point substantially lower than the expected maximum ambient air temperatures. This way, heat can be transferred from the coolant fluid 735 to the thermal storage medium 516 while the fluid has a temperature which is greater than the melting point of the thermal storage medium 516, but may be less than the ambient air temperature. Salt hydrates can be used, but some salt hydrates must be stabilized to achieve consistent performance through a large number of phase change cycles.

Figure 8:
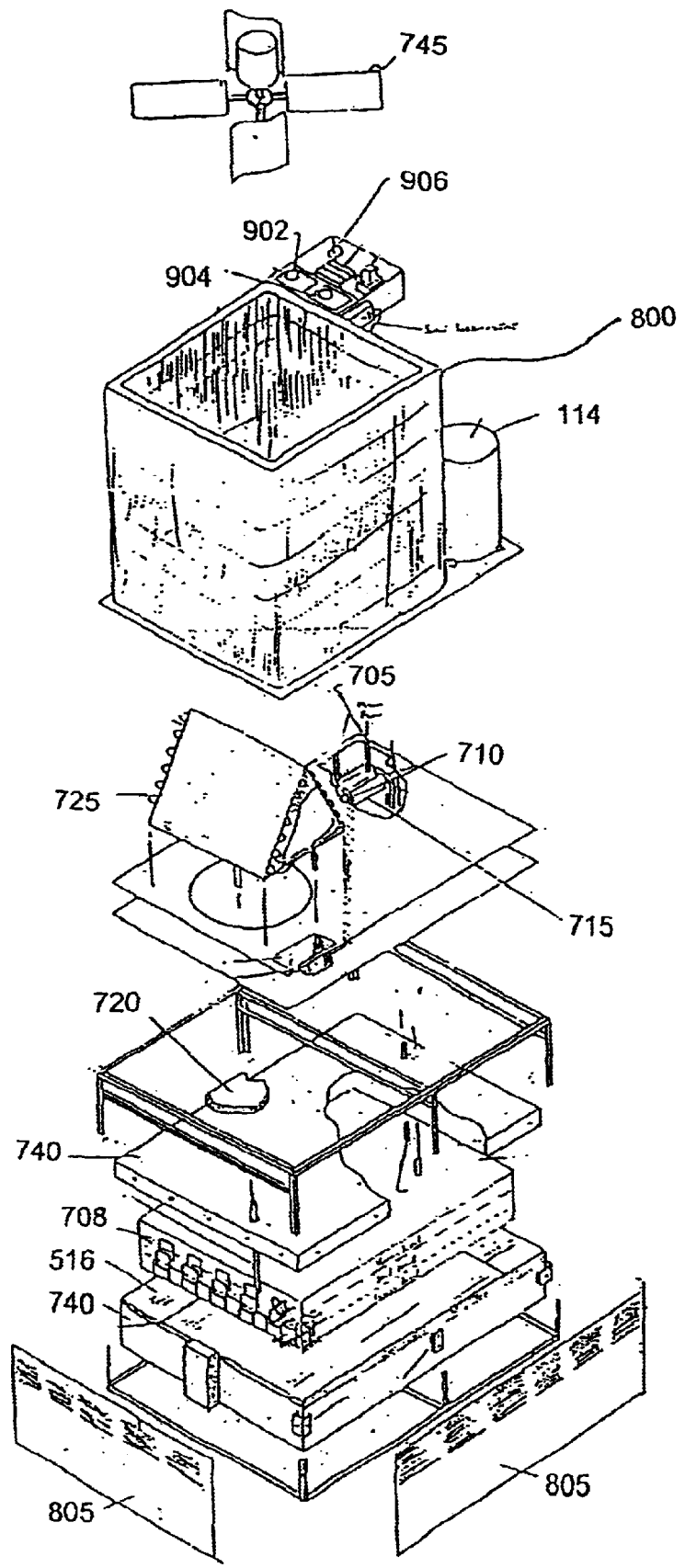
FIG. 8 is an exploded front perspective view of an existing air conditioning unit coupled to a heat storage unit according to the present invention, and identifying a stacked configuration.
Figure 9:
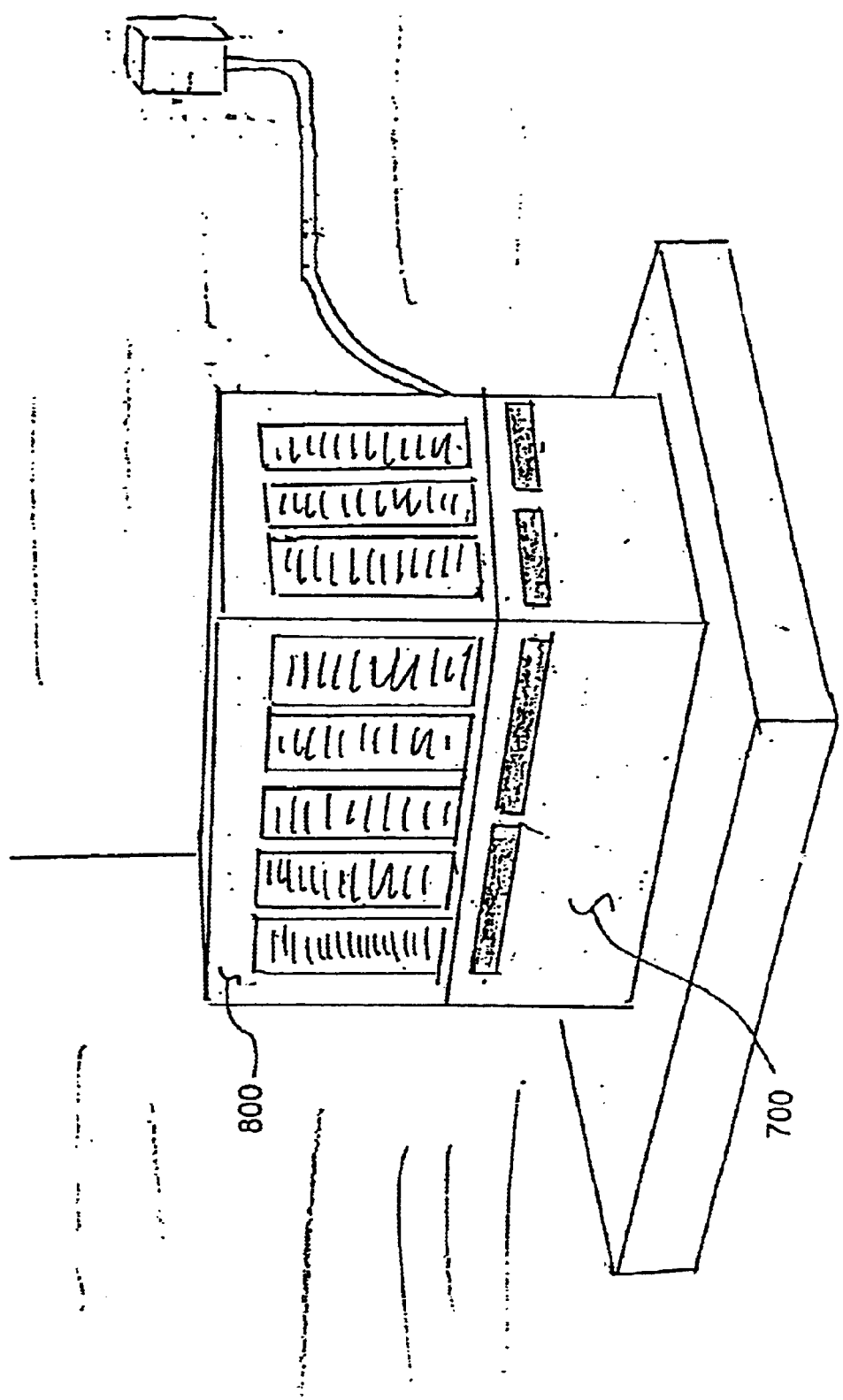
FIG. 9 is perspective view of an existing unit air conditioning unit positioned above a heat storage unit as actually installed on location.

Referring to FIG. 8, an exploded view of one embodiment of the present invention is provided where a conventional air conditioning unit 800 is stacked on top of a thermal energy storage unit. Preferably thermostat 902 senses the ambient temperature and activates the pump in the thermal storage unit when a predetermined temperature is reached. The working fluid 703 of the air conditioner 800 is placed in thermal communication with a fluid in a cooling fluid loop 710 of the thermal heat storage unit via a heat exchanger 715. The heated fluid in the cooling fluid loop 710 is then passed through a liquid-to-air heat exchanger 725, which is aided by an existing fan 745 of the air conditioner 800. The cooling fluid 735 is then routed to a thermal storage heat exchanger 708, that is submerged in a thermal storage medium 516, and which are both enclosed in a container 740 and insulated 720. The cooling fluid 735 is then routed back into thermal communication with the working fluid 703 of the air conditioner 800. The whole process is repeated until the ambient temperature falls below the predetermined level and the thermostat 902 disengages the pump.

The thermal storage unit is required to freeze the thermal storage medium 516. A photocontrol switch 906 in one embodiment senses the ambient light and activates the pump and perhaps the fan 745 at night or at other times of low light when the ambient temperature is cooler. The cooling fluid is routed through the same cycle as described above with the exception of the initial heat exchanger step 715. The cooling fluid 735 in the cooling loop 710 is continuously put into thermal communication with the thermal storage medium 516 until a deactivate thermostat 904 senses that the thermal storage medium 516 is below its freezing point and disengages the pump and the fan 745.

The preferred coolant circulation fluid 735 is a mixture of 50% polypropylene and 50% water. This mixture is non-toxic and will protect the system against freezing in most areas of the country. Alternatively, water and other additions commonly known in the art may be used in areas that do not experience freezing temperatures.

The heat exchanger 715 that transfers heat from the air conditioner working fluid 703 to the thermal storage unit is generally piped in a counter flow configuration and is preferably a brazed plate heat exchanger, such as those manufactured by WTT America. As appreciated by one skilled in the art, alternative designs may also be employed.

The liquid-air heat exchanger 725 transfers heat from the coolant fluid 735 to the ambient air. This heat exchanger is typically constructed of finned-tubes arranged such that air passes over the fins to remove heat. Typical configurations include "A-coil" or "Horizontal-flow coil" designs used for air conditioner evaporators. A fan 745 may provide the airflow for the heat exchanger. Preferably, the existing fan of the condensing unit of the air conditioner may be used to save expense, or a separate dedicated fan could also be implemented.

FIG. 10 shows two embodiments of heat exchangers which are used to transfer heat between the coolant fluid 735 and the thermal storage medium 516. More specifically, the heat exchanger fins or plates are generally immersed in the storage medium to maximize heat transfer and to melt and freeze the medium as uniformly as possible. The preferred construction is a plurality of finned-tubes 810 & 811 arranged to create several flow paths in a counter flow arrangement. An alternate design is a plurality of parallel plates 814 through which the circulating fluid flows as well as any other type of heat-exchanging configuration which is well known in the art. Ideally, the coolant fluid 735 would flow in opposite directions in alternating plates, and the heat exchanger may also include a means to balance the flow between the various conduits on heat exchanging branches.

A closed plastic or metal container 740 is generally provided to surround the storage medium 516 and the heat exchanger in one confined space. Ideally, the container 740 is air-tight to preserve the storage medium 516 and enhance the heat exchanging capabilities of the unit. Generally, at least two penetrations are necessary for the intake and output fluid lines.

A pump 730 is used to circulate the coolant fluid 735 in the system. The pump 730 will typically provide a flow rate of between about 0.5 and 5 gallons per minute with a pressure of up to 10 pounds per square inch (psi). It typically operates with 240 volts AC to be consistent with the power supplied to the air conditioner, but wiring can be added to allow it to operate at 120 volts AC.

Figure 11:
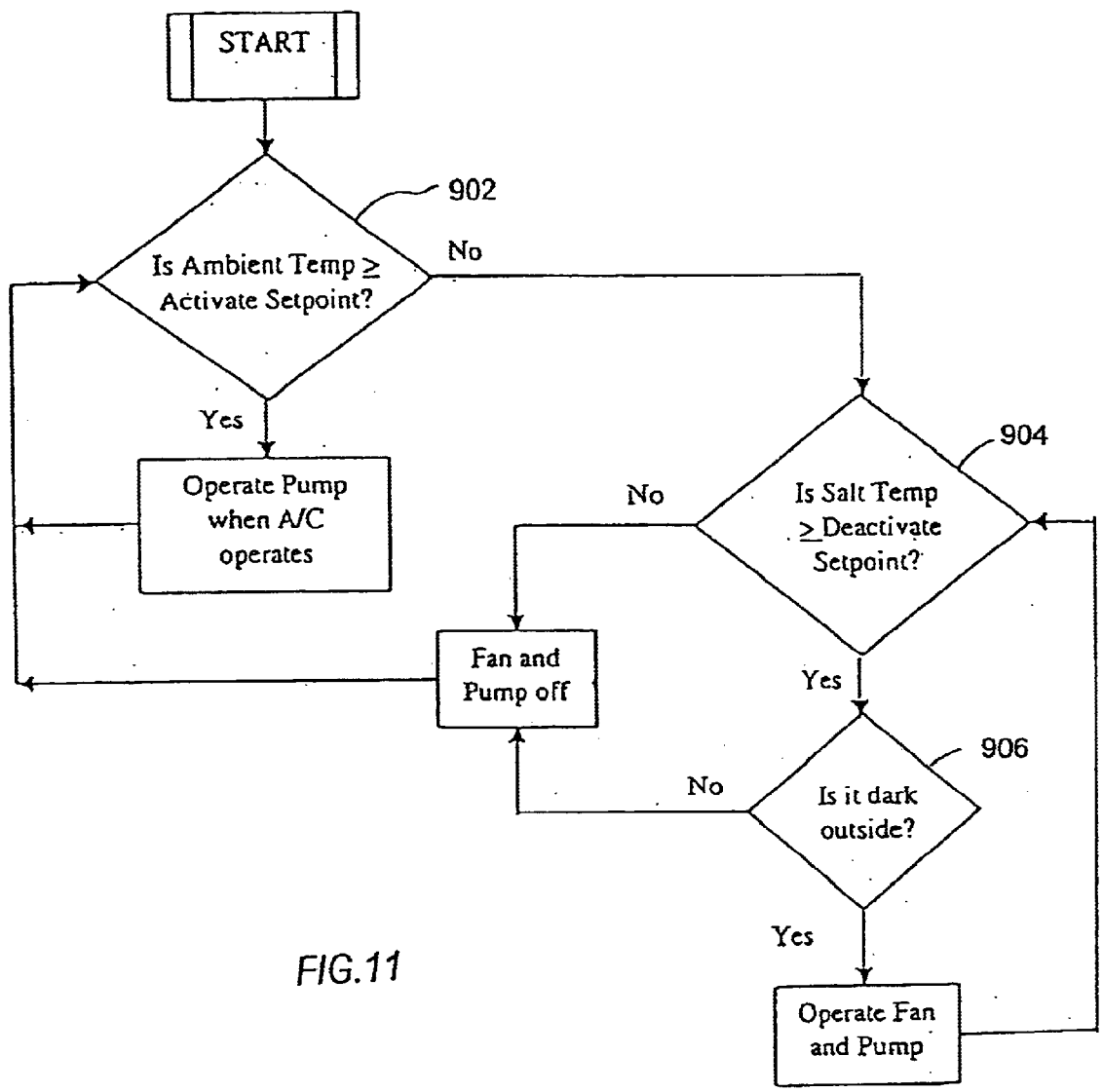
FIG. 11 is a flow diagram of the control logic that controls the activation and deactivation of numerous components used in one embodiment of the present invention.

FIG. 11 shows one embodiment of the control logic used to activate and deactivate the system 700. The controls ensure that the thermal storage system is only used when necessary and that the stored energy is rejected at night when the air temperature is below a threshold temperature. In operation, the ambient air temperature senses and activates a thermostat 902 which is typically set at between 80–85° F. Preferably, the system is configured so that when ambient air temperatures are relatively low, such as below a first threshold temperature (which may be set approximately equal to the melting point of the thermal storage medium), working fluid 703 is air-cooled by the air conditioner's existing condenser. If ambient air temperature exceeds the first threshold temperature, the pump is activated when the air conditioner activates in response to an indoor thermostat signal. Upon air conditioner activation, fluid 735 is pumped through the circulation loop 710 so that it will come into thermal communication with the working fluid 703. This process will persist as long as the ambient air temperature is greater than the first threshold temperature. Accordingly, heat from the fluid 735 will continue to be transferred to the thermal storage medium 516, melting some or all of the thermal storage medium 516 and eventually raising the temperature of the thermal storage medium 516. As described above, when the ambient air temperature is below the first threshold temperature, the pump will deactivate and the air conditioner's working fluid will be cooled without the aid of the auxiliary unit.

The freezing cycle may be activated with a photocontrol switch 906 which would activate the pump and fan at night. A timer may also be used to dictate when the pump and fan activate. Alternatively, the pump and fan may be programmed to operate whenever the ambient air temperature falls below the freezing temperature of the storage medium, perhaps when the day becomes cloudy. In any embodiment, a deactivate thermostat 904 may be used to stop the freeze cycle when the medium temperature drops below a set point. This minimizes the power requirements for the freeze cycle while ensuring the salt is thoroughly solidified. It also prevents the cycle from operating when it is not required, for example during cooler summer nights. The storage medium thermostat is typically set to 70–75° F.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

To assist in the understanding of the present invention the following list of components and associated numbering found in the drawings is provided herein:

| # | Component |
|---|---|
| 112 | Evaporator |
| 114 | Compressor |
| 116 | Condenser |
| 118 | Expansion valve or capillary |
| 122 | Fan (Condenser) |
| 124 | Fan (Evaporator) |
| 126 | Cooled Air Flow |
| 132 | Thermal Storage Unit |
| 142 | Switch or Valve |
| 144 | Flow of Working Fluid |
| 152 | Switch or Valve |
| 312 | Thermostat |
| 314 | Fan (Thermal Storage Unit) |
| 316 | Air Flow Passages in the Thermal Storage Unit |
| 412 | Fan or Blower Used for Freezing Phase |
| 414 | Ambient Air used for Freezing Phase |
| 512 | Thermal Storage Medium Container |
| 514 | Channels |
| 516 | Thermal Storage Medium |
| 518 | Heat Transfer Plate |
| 522 | Coils |

-continued

| # | Component |
|---|---|
| 612 | Sensing of Ambient Air |
| 614 | Ambient Air/1st Threshold Temperature Comparison |
| 616 | Transfer of at least some of the condenser heat to the Thermal Storage Medium |
| 618 | Completion of cooling cycle after condenser and/or Thermal Storage Medium heat transfers |
| 619 | Ambient Air/2nd Threshold Temperature Comparison |
| 622 | Transfer of condenser heat to ambient air |
| 624 | Transfer of heat from Thermal Storage Medium |
| 700 | Thermal Energy Storage Unit |
| 703 | Working Fluid |
| 705 | Working Fluid loop |
| 708 | Thermal Storage Unit Heat exchanger |
| 710 | Cooling circulation Loop |
| 715 | Working Fluid/Thermal Storage Unit Fluid Heat Exchanger |
| 720 | Insulation |
| 725 | Liquid-air heat exchanger |
| 730 | Pump |
| 735 | Coolant |
| 740 | Thermal Storage Medium Container |
| 745 | Fan |
| 800 | Air Conditioning Unit |
| 805 | Enclosure |
| 810 | Heat Exchanger Tube |
| 811 | Heat Exchanger Fin |
| 814 | Heat Exchanger Parallel Plate |
| 816 | Heat Exchanger Tube |
| 902 | Activate Thermostat |
| 904 | Deactivate Thermostat |
| 906 | Photo control Switch |

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing reduced energy consumption of a cooling unit for cooling at least a first space, the cooling unit having at least a compressor, for compressing a working fluid, a condenser and an evaporator, the method comprising:

transferring at least first heat from said working fluid to a second fluid;

placing said second fluid in thermal communication with a first change-of-phase heat storage material having a first temperature whereby at least some of said first change-of-phase material changes from a first phase to a second phase and absorbs latent heat, and wherein said first phase is substantially solid and said second phase is substantially liquid;

transferring heat from said change-of-phase material to the ambient air whereby at least some of said change-of-phase material changes phase from said second phase to said first phase and releases latent heat.

2. The method as in claim 1, wherein said working fluid is Freon.

3. The method as in claim 1, wherein the said second fluid is at least one of a polypropylene and a water.

4. The method as in claim 1, wherein said step of transferring at least first heat from said working fluid to a second fluid comprises utilizing a heat exchanger.

5. The method as in claim 1, wherein said step of placing said second fluid in thermal communication with a first change-of-phase heat storage material comprises circulating said second fluid through at least one conduit positioned within said first change-of-phase heat storage material.

6. The method of claim 5, further comprising utilizing a plurality of heat exchanging fins operably interconnected to said one conduit containing said second fluid.

7. The method as in claim 1, wherein said second fluid is circulated in a closed loop comprising a pump, a container with said first change of phase heat material and a first heat exchanger which transfers thermal energy between said working fluid and said second fluid.

8. The method of claim 7, further comprising the step of reducing heat from said second fluid by circulating ambient air over a second heat exchanger positioned in said closed loop.

9. The method of claim 7, further comprising a pump control means, wherein said second fluid is circulated by said pump only when an ambient air temperature is lower than a predetermined level.

10. An apparatus adapted to reduce energy consumption of a cooling unit for cooling at least a first space, the cooling unit having a compressor, for compressing a working fluid, a condenser and an evaporator operably interconnected in a first closed loop, comprising:

a means for transferring a heat energy from the working fluid circulating in said first closed loop to a second fluid circulating in a second closed loop;

means for transferring at least first heat from said second fluid to a first change-of-phase heat storage material having a first temperature, whereby at least some of said first change-of-phase material changes from a substantially solid first phase to a substantially liquid second phase and absorbs latent heat;

means for transferring heat from said change-of-phase material to an ambient air, whereby at least some of said change-of-phase material changes phase from said substantially liquid second phase to said substantially solid first phase and releases latent heat.

11. The apparatus of claim 10, further comprising pump means in communication with said second fluid to circulate said second fluid in said closed loop.

12. The apparatus of claim 11, further comprising a control means in operable communication with said pump means, wherein said pump means is operating only when said ambient air has a temperature below a predetermined level.

13. The method of claim 10, wherein said means for transferring heat from said change-of-phase material to said ambient air comprises utilizing a fan means to increase a volume of air passing in close proximity to said change of phase material.

14. The method of claim 10, wherein the heat is transferred from said second fluid to said change-of-phase material during a first time period and the heat is transferred from said change-of-phase material to said ambient air during a second time period.

15. The method of claim 10, wherein said change of phase material comprises a salt hydrate.

16. The apparatus of claim 10, wherein said means for transferring heat energy from said working fluid to a second fluid comprises a heat exchanger.

* * * * *